No. 890,685. PATENTED JUNE 16, 1908.
I. MURPHY.
LOCKING DEVICE FOR NUTS.
APPLICATION FILED MAY 9, 1907.
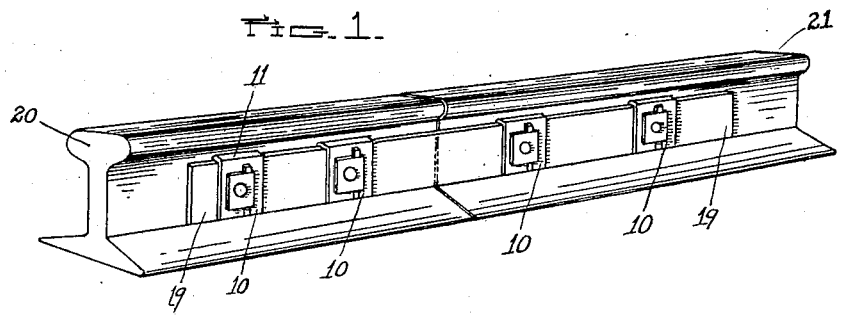
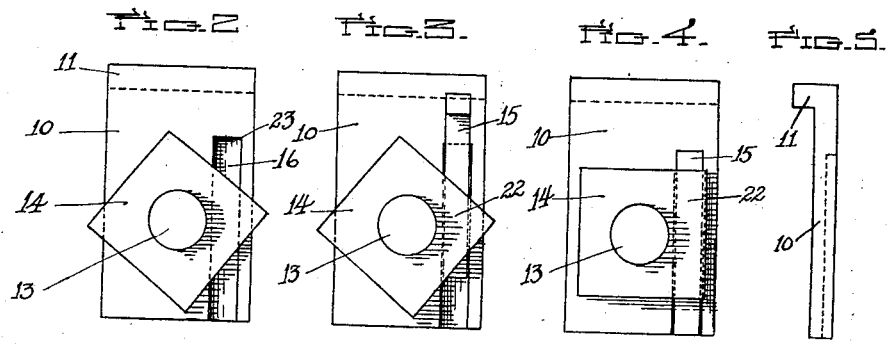
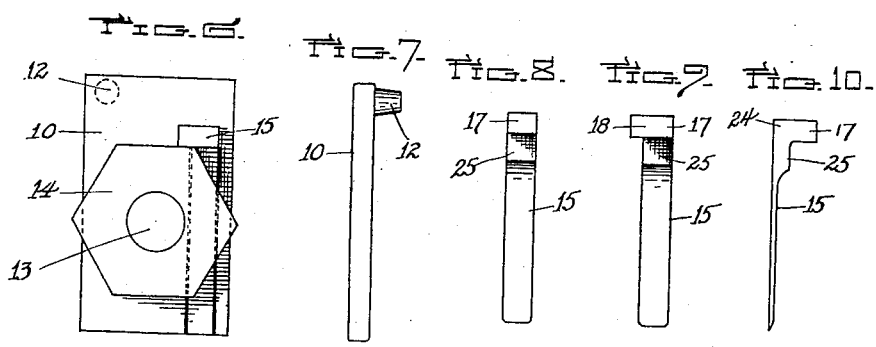
Witnesses:
E. N. Barker.
Mary E. Hickey.
Inventor:
Isaiah Murphy
By Hartley H. Bartlett, Atty.

UNITED STATES PATENT OFFICE.

ISAIAH MURPHY, OF NORTH LEOMINSTER, MASSACHUSETTS.

LOCKING DEVICE FOR NUTS.

No. 890,685.      Specification of Letters Patent.      Patented June 16, 1908.

Application filed May 9, 1907. Serial No. 372,787.

*To all whom it may concern:*

Be it known that I, ISAIAH MURPHY, a citizen of the United States, residing at North Leominster, in the county of Worcester, State of Massachusetts, have invented a certain new and useful Improvement in Locking Devices for Nuts, of which the following is a specification, reference being had therein to the accompanying drawings.

This invention relates to locking means for nuts.

Heretofore numerous methods have been devised to prevent the accidental loosening of nuts upon bolts, but these have in general been defective or impractical. A common form consists in the use of a second or lock nut upon the bolt, but this does not properly prevent the movement of the nut. There have been numerous forms of nuts containing mechanisms to grip the bolt, but these are too expensive to be practical. Another form previously devised breaks the thread of the bolt and, though it may not work loose, has to be cut off when it is desired to remove the bolt for any purpose.

The object of this invention is to provide a locking means for nuts which will entirely prevent their loosening and which will allow the nut to be removed without destroying the bolt. Such a type is particularly desirable in the case of rail joints and the springs and braces of railway cars. The spasmodic jar in the former and the constant jar in the latter use cause the nuts to work loose very quickly if not properly fastened.

One embodiment of my invention consists of a plate, having a tap hole drilled therein to contain the bolt, provided with a recess into which is set a removable key with outwardly extending flange or head to engage one of the corners of the nut and prevent its turning upon the bolt. This device allows a bolt and nut of the ordinary type to be used and only necessitates the placing of one of these plates upon each bolt.

The construction and arrangement of parts in this locking device is such that the key may be readily inserted or removed from the recess to lock or unlock the nut, respectively, but accidental release is impossible. The key is preferably made of maleable iron, but any suitable substance might be used. The plate is preferably provided with a flange or pin to prevent its turning with the bolt. Numerous forms of this plate are shown in the drawings and will be more fully described hereinafter. Bolts and nuts wear out and have to be replaced, but one plate could be used with an indefinite number or bolts.

The preferable embodiment of this invention is shown in the accompanying drawing in which:—

Figure 1 is a perspective view of the invention showing the method of attachment to a rail. Fig. 2 is a front elevation of the invention with the key removed, as will be more fully described hereinafter. Fig. 3, same as Fig. 2 with key partially inserted. Fig. 4, same as Fig. 2 with key in place and nut locking the same. Fig. 5, side view of locking plate. Fig. 6, same as Fig. 4 with hexagonal nut. Fig. 7, side view of a locking plate, showing one form of preventing the turning of same. Figs. 8 to 10 inclusive, types of keys.

In the drawings, 10 is the locking plate provided with a flange 11 or a pin 12 to prevent the same from turning with the bolt 13. The nut 14 is shown upon this bolt. A key 15 fits in the recess 16 in the plate 10 and is provided with a flange or head 17 to lock the nut 14 as will be described hereinafter. The form of this key varies slightly, depending on the style of nut on the bolt. When a hexagonal nut is used, the key should have a shoulder 18 as is shown in Fig. 6, but a key of the form shown in Fig. 4 is adequate with a square nut.

The locking plate is generally used in connection with a fish-plate or similar form which allows the flange 11 to lap the edge, as is shown in Fig. 1, thus preventing any turning of said locking plate. Where it is to be used on a surface which will not allow of this lapping, it may be provided with a pin 12, which will fit in a recess bored in the surface.

In Fig. 1 is shown a complete rail joint fitted with the invention, 20 and 21 being sections of rails, respectively, and 19, the fish-plate.

The method of locking the nut is shown in three successive stages in Figs. 2 to 4, inclusive. In Fig. 2, the plate is shown with the recess empty, but the nut turned in readiness for the insertion of the key 15. Fig. 3 shows the key partially inserted and Fig. 4 shows the key in place with the nut turned to lock it in the recess.

The method is as follows:—The nut is turned on the bolt until it is tight; it is then loosened sufficiently to put it in the position shown in Fig. 3, the key shoved point first into the recess under the nut with the flange pointing outward, and the nut is then unscrewed a little further to bring the corner 22 of the nut against the flange of the key in the position of Fig. 4.

The recess 16 should have a square corner 23 to hold the corner 24 of the key. The key is provided with a thickened portion 25 near its head so that the nut, when turned into the position of Fig. 4, will hold it firmly in the recess. The method of removal of the key from the recess in the locking plate is the reverse of the method of insertion.

I claim:—

1. In a locking device for nuts, the combination with a bolt and a nut therefor, of a locking plate, means for preventing the movement of the same and non-rotatable means carried by said plate for locking said nut, provided with a rigid locking portion and held in said plate by said nut in any position.

2. In a locking device for nuts, the combination with a bolt and a nut therefor, of a locking plate, means for preventing the movement of the same and a non-rotatable key carried by said plate provided with a rigid locking portion, said portion being held in said plate by the nut in any position.

3. In a locking device for nuts, the combination, with a bolt and a nut therefor, of a locking plate, means for preventing the movement of the same, and a non-rotatable key carried by said plate provided with a rigid locking portion, said portion being held in said plate by the nut in any position.

4. In a locking device for nuts, the combination with a bolt and a nut therefor, of a locking plate, means for preventing the movement of the same, and a non-rotatable key carried by said plate having a rigid locking flange, said locking flange being held in said plate by the nut in any position.

5. In a locking device for nuts, the combination with a bolt and a nut therefor, of a locking plate, means for preventing the movement of the same and a non-rotatable key, provided with a rigid locking flange, seated in a recess in said plate, said locking flange being held in said recess by the nut in any position.

6. In a locking device for nuts, the combination with a bolt and a nut therefor, of a locking plate, means for preventing the movement of the same, and a removable non-rotatable key carried by said plate provided with a rigid locking portion said portion being held upright in said plate by the nut in any position.

7. A key provided with a flange, a thickened portion, adjacent to said flange, and a thin blade, perpendicular to said flange.

In testimony whereof I affix my signature in presence of two witnesses.

ISAIAH MURPHY.

Witnesses:
HARTLEY H. BARTLETT,
MARY E. HICKEY.